(12) United States Patent
Feng et al.

(10) Patent No.: US 7,301,674 B2
(45) Date of Patent: Nov. 27, 2007

(54) TRANSLATION OF AN INPUT PIXEL VALUE TO AN OUTPUT PIXEL VALUE

(75) Inventors: Guotong Feng, West Lafayette, IN (US); Michael George Fuchs, Boise, ID (US); Charles A. Bouman, West Lafayette, IN (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 995 days.

(21) Appl. No.: 10/284,955

(22) Filed: Oct. 31, 2002

(65) Prior Publication Data

US 2004/0085586 A1    May 6, 2004

(51) Int. Cl.
*H04N 1/405* (2006.01)

(52) U.S. Cl. .................... 358/3.03; 358/3.06
(58) Field of Classification Search ............ 358/1.9, 358/2.1, 3.03–3.06, 3.01; 382/251–253
See application file for complete search history.

(56) References Cited

U.S. PATENT DOCUMENTS

| | | | |
|---|---|---|---|
| 5,272,764 A | | 12/1993 | Bloomberg et al. |
| 5,418,626 A | * | 5/1995 | Semasa ............ 358/451 |
| 5,570,432 A | | 10/1996 | Kojima |
| 5,712,927 A | * | 1/1998 | Kim et al. ......... 382/252 |
| 5,796,876 A | * | 8/1998 | Wang et al. ........ 382/270 |
| 5,926,226 A | * | 7/1999 | Proctor et al. ..... 375/240.22 |
| 6,222,643 B1 | * | 4/2001 | Moskalev ........... 358/1.9 |
| 6,298,151 B1 | | 10/2001 | Jodoin et al. |
| 6,373,981 B1 | | 4/2002 | de Queiroz et al. |
| 6,400,844 B1 | | 6/2002 | Fan et al. |
| 6,501,566 B1 | | 12/2002 | Ishiguro et al. |
| 6,519,367 B2 | * | 2/2003 | Nagarajan et al. .... 382/252 |
| 6,760,127 B1 | * | 7/2004 | Shin et al. ......... 358/3.03 |

FOREIGN PATENT DOCUMENTS

| | | |
|---|---|---|
| EP | 0702482 | 6/2001 |
| JP | 10-285390 | 10/1998 |

OTHER PUBLICATIONS

P. Li and J. P. Allebach, *Tone Dependent Error Diffusion, Color Imaging: Device Independent Color, Color Hardcopy, and Applications VII*, R. Eschbach and G. G. Marcu, eds, SPIE vol. 4663, San Jose, CA Jan. 22-25, 2002, pp. 310-321.

* cited by examiner

*Primary Examiner*—Thomas D. Lee
*Assistant Examiner*—Stephen Brinich

(57) ABSTRACT

A device to translate an input pixel value to an output pixel value for a current pixel includes a diffusion block to produce a diffusion error to add to the input pixel value to produce a diffused pixel value. In addition, the device includes a feedback modulation block to generate a threshold value, the threshold value determined using a value of an earlier output pixel value, the earlier output pixel value occurring at a predetermined number of pixels prior to the current pixel. Furthermore, the device includes a quantizer to compare the diffused pixel value to the threshold value and based on the comparison to select a value for the output pixel value.

42 Claims, 7 Drawing Sheets

TRANSLATION OF AN INPUT PIXEL VALUE TO AN OUTPUT PIXEL VALUE

BACKGROUND

A digital sender is a system designed to obtain scan documents (for example by scanning), convert the documents to a chosen format and route the formatted document to a desired destination or destinations using an available communication protocol. Digital senders generally support a variety of document types, a variety of data formats, and a variety of communication protocols.

Examples of typical document formats include tagged image file format (TIFF), multipage TIFF (MTIFF), portable document format (PDF), and joint picture experts group (JPEG). Examples of typical communication methods include computer networks and facsimile transmission (fax).

Documents can be classified based on content. For example, text documents typically contain black text on a white background. Formats used to transmit text documents typically are optimized to provide for crisp edges to effectively define characters. Traditional fax is designed to efficiently transmit text (black text on a white background) documents.

Graphics documents typically contain color or grayscale images. Formats used to transmit continuous tone images, for example, continuous tone color photographs, can be very effectively represented using the JPEG format.

Mixed content documents typically include a combination of text and graphic data. These documents often require more specialized solutions because existing formats used for transmission and storage of image data are optimized for use with either black and white text, or with continuous tone images.

The current TIFF specification supports three main types of image data: black and white data, half tones or dithered data, and grayscale data.

Baseline TIFF format can be used to store mixed content documents in black and white (i.e. binary) formats. Baseline TIFF format supports three binary compression options: Packbits, CCITT G3, and CCITT G4. Of these, CCITT G3, and CCITT G4 compression are compatible with fax machines.

Halftoning algorithms, such as error diffusion, can be used to create a binary representation of (i.e. binarize) a continuous tone image. Such an image can be subsequently compressed using CCITT G3, and CCITT G4 compression so they are suitable for fax transmission. However, CCITT G3 compression, and CCITT G4 compression generally do not provide for the desired the compression ratios for halftone images, particularly when used for compression of images halftoned using error diffusion. This is problematic because error diffusion is a method for producing high quality binary representations of images when the sampling resolution is limited (e.g., 300 dpi).

Packbits compression is a run length encoding algorithm that is more effective at compressing error diffusion halftones than CCITT G3 or CCITT G4 compression. However, the size of PackBits compressed files may be larger than is desirable.

SUMMARY OF THE INVENTION

In accordance with the preferred embodiment of the present invention, a device to translate an input pixel value to an output pixel value for a current pixel includes a diffusion block to produce a diffusion error to add to the input pixel value to produce a diffused pixel value. In addition, the device includes a feedback modulation block to generate a threshold value, the threshold value determined using a value of an earlier output pixel value, the earlier output pixel value occurring at a predetermined number of pixels prior to the current pixel. Furthermore, the device includes a quantizer to compare the diffused pixel value to the threshold value and based on the comparison to select a value for the output pixel value.

DESCRIPTION OF THE PREFERRED EMBODIMENT

Figure 1:
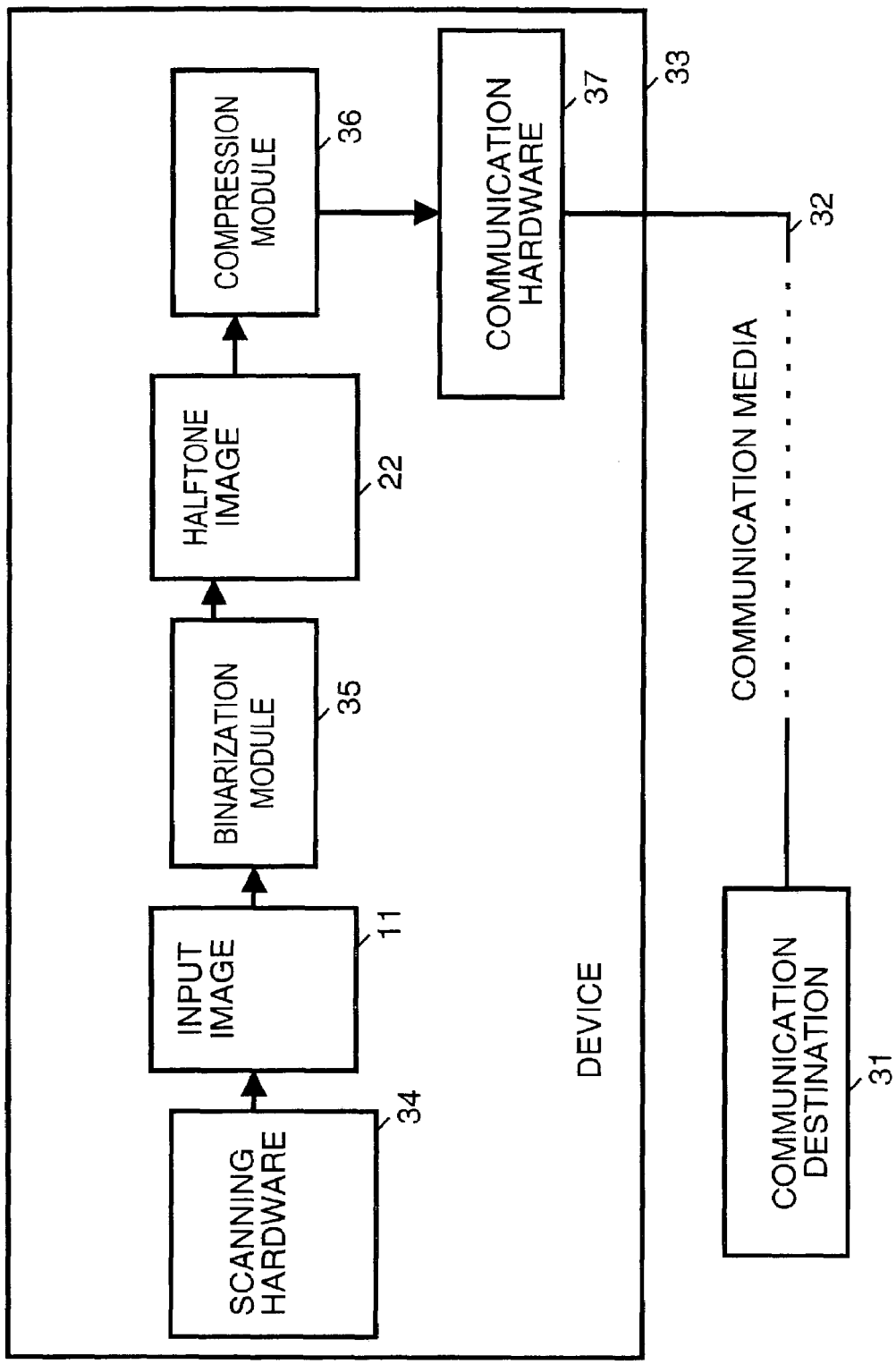
FIG. 1 is a block diagram of a device.

FIG. 1 is a simplified block diagram of a device 33. Device 33 is, for example, a digital sender such as a scanner, a fax machine or some other device that sends information in digital form. Alternatively, device 33 can be any device that handles image information, such as a printer or a copier.

Device 33 includes, for example, scanning hardware 34 that performs a scan to produce an input image 11. Input image 11 could, for example, be obtained in other ways such as by an access from an information storage device. Also, input image 11 is, for example, a grayscale image. Alternatively, input image 11 is a color image or another type of image that can be generated by scanning hardware 34 or accessed by some other means.

A binarization module 35 binarizes input image 11 to produce a halftone image 22. Binarization module 35 can be implemented in a number of different ways, for example by a processor and firmware, by software or within an application specific integrated circuit (ASIC).

A compression module 36 is used to perform compression on halftone image 22 in preparation for sending, through communication hardware 37, to a communication destination 31 via communication media 32. For example, compression module 36 uses PackBits compression or some other compression algorithm that utilizes run length encoding.

PackBits compression is a simple byte-oriented run-length compression scheme in which all repeated bytes are encoded as one or more replicate runs. Communication media 32 can be, for example, a metal wire, optical media or a wireless communication media.

Figure 2:
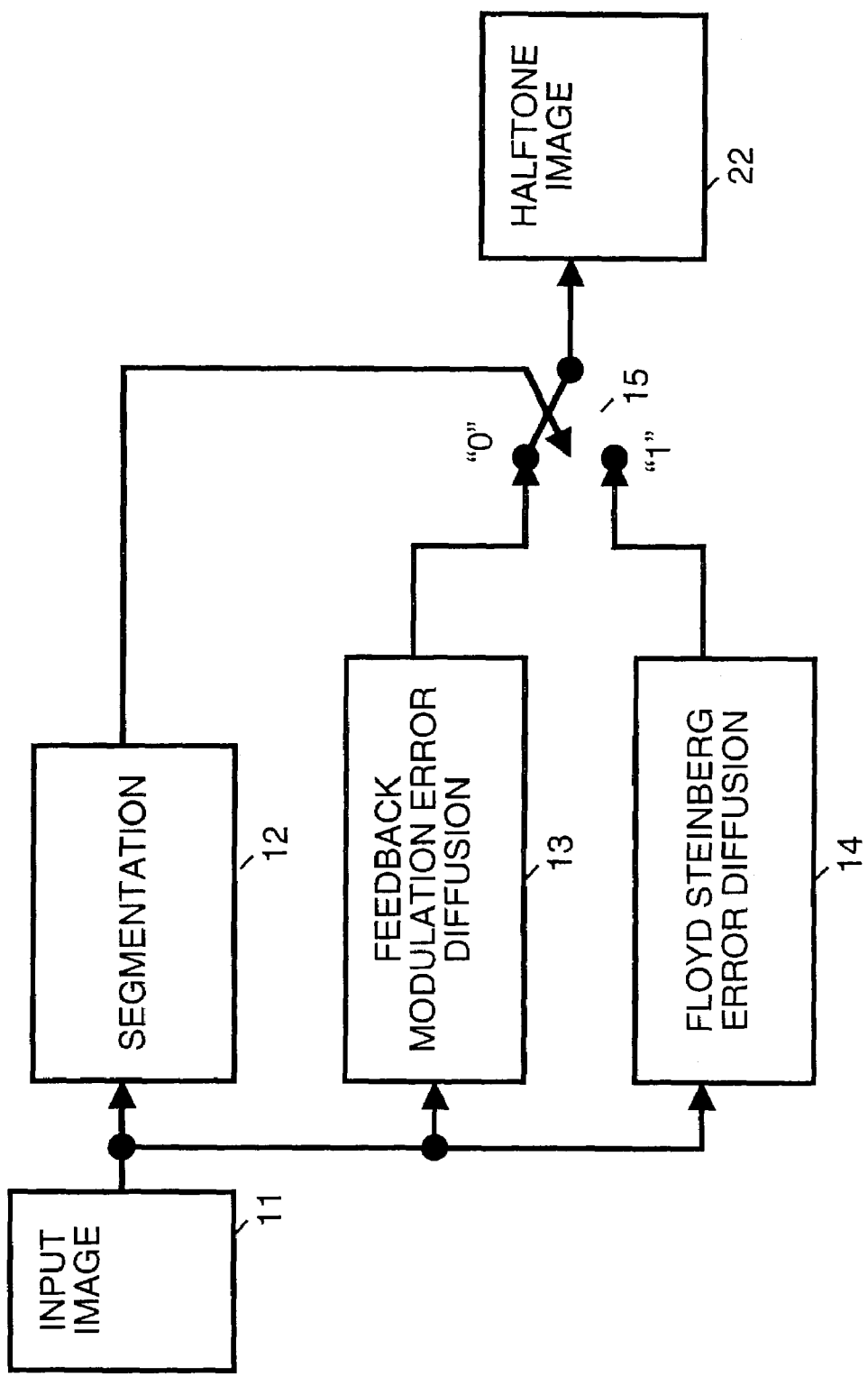
FIG. 2 is a block diagram that illustrates error diffusion halftoning of a document performed with enhanced run length encoding efficiency in accordance with a preferred embodiment of the present invention.

FIG. 2 is a simplified block diagram that illustrates operation of binarization module 35. Binarization module 35 performs error diffusion halftoning on a document to produce enhanced run length encoding efficiency.

Binarization module 35 performs error diffusion adapted for PackBits compression referred to herein as PackBits adapted error diffusion (PAED). PAED is a modified form of error diffusion which is designed to produce halftones that can be more efficiently compressed using PackBit compression or other byte-oriented run-length compression schemes. PAED provides efficient compression while preserving much of the desirable quality of error diffusion halftoning. PAED is designed to create binary representations of a mixed text and graphics document that can be efficiently compressed using the baseline TIFF supported compression. This approach is particularly suitable for documents that are scanned and distributed as e-mail attachments.

For each pixel of input image 11, segmentation block 12 controls a switch 15 which selects either a feedback modulation error diffusion block 13 or a Floyd Steinberg error diffusion block 14 to produce a corresponding pixel in halftone image 22. Floyd Steinberg error diffusion block 14 uses the Floyd Steinberg error diffusion technique to produce a halftone pixel. Floyd Steinberg error diffusion is exemplary and any known type of error diffusion could be performed instead of Floyd Steinberg error diffusion.

Feedback modulation error diffusion block 13 uses an adaptive error diffusion algorithm which takes advantage of the byte-oriented run length structure of PackBits compression to encourage repetition of bytes in the resulting binary image. The feedback modulation error diffusion has different weights from those of Floyd Steinberg error diffusion. The weights are adjusted for the desired tradeoff of bit rate and distortion. In addition, the combined weights of both error diffusion processes are adjusted by a parameter b which is also set to achieve a desired result.

To maintain the text quality, segmentation block 12 selects Floyd Steinberg error diffusion block 14 to halftone pixels of input image 11 segmentation block 12 recognizes as text region. To increase compressibility, segmentation block 12 selects feedback modulation error diffusion block 13, to halftone pixels of input image 11 segmentation block 12 recognizes as background region. This selection is done because, while feedback modulation error diffusion block 13 performs well in background region, feedback modulation error diffusion block 13 can also produce some undesirable noise around the text edges. Consequently, it is desirable, therefore, to switch off feedback modulation error diffusion block 13 in the text regions, and to switch on error diffusion such as is provided by Floyd Steinberg error diffusion block 14.

Figure 3:
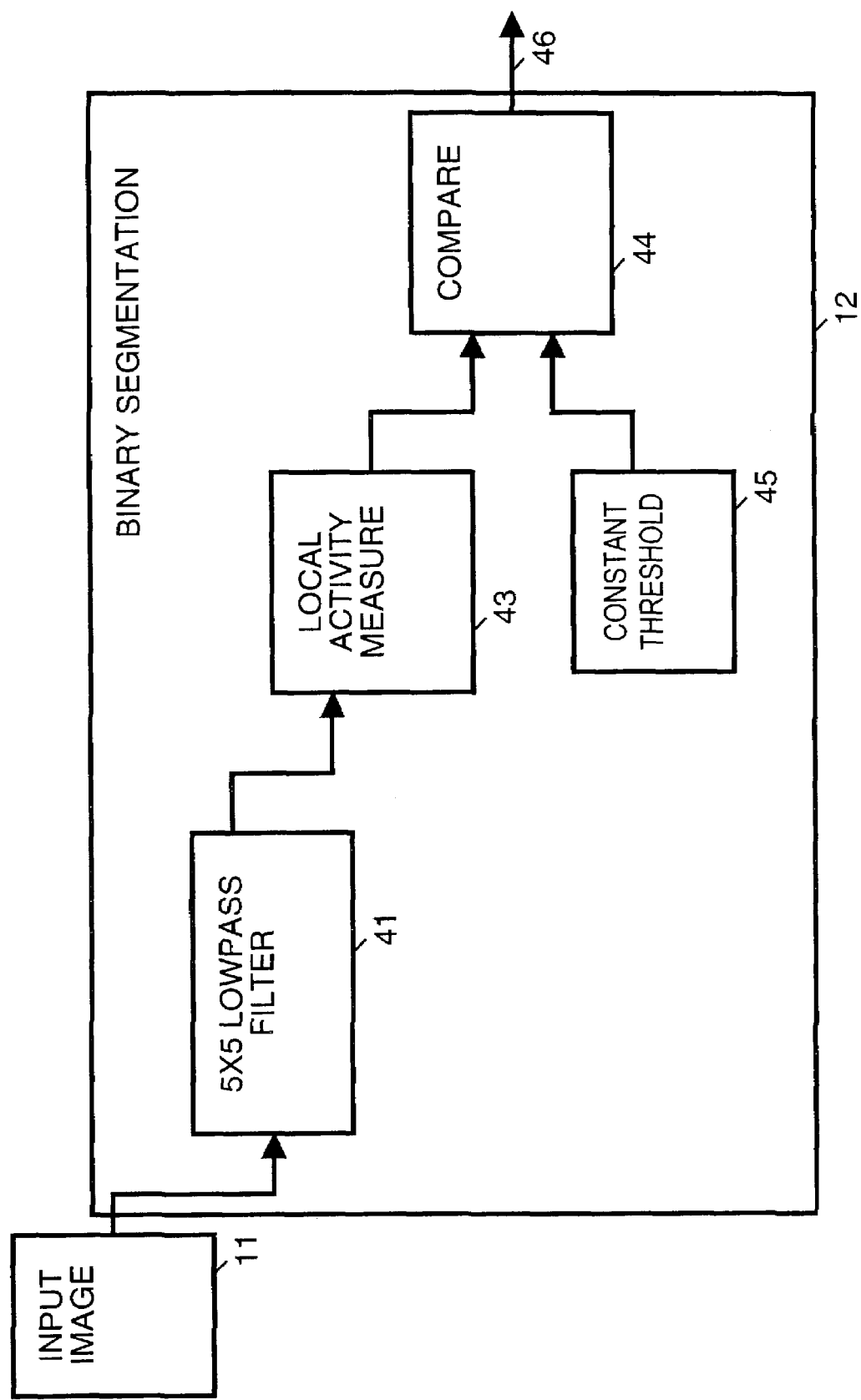
FIG. 3 is a simplified block diagram of a segmentation block in accordance with a preferred embodiment of the present invention.

FIG. 3 is a simplified block diagram of segmentation block 12. A 5×5 lowpass filter 41 preprocesses input image 11. The result is used as an input image for a local activity measure block 43. Local activity measure block 43 computes a local activity measure for each pixel. Local activity measure block 43 computes the local activity measure by the local difference, obtained by taking the mean square error over a 3×3 local window of the filtered imaged obtained from 5×5 lowpass filter 41.

A compare block 44 compares constant threshold 45 to the local difference of each pixel provided by local activity measure block 43. If the local difference is larger than constant threshold 45, the output placed on line 46, used to control switch 15 shown in FIG. 2, is set to "1" and the pixel is classified as text; otherwise, the output placed on line 46 is set to "0" and the pixel is classified as background.

Constant threshold 45 is adjusted to achieve a desired efficiency in separating text from background taking into account a balance between bit rate and distortion. Implementation details such as the size of the local window in local activity measure block 43 and the size of lowpass filter 41 can vary greatly based on implementation.

Figure 4:
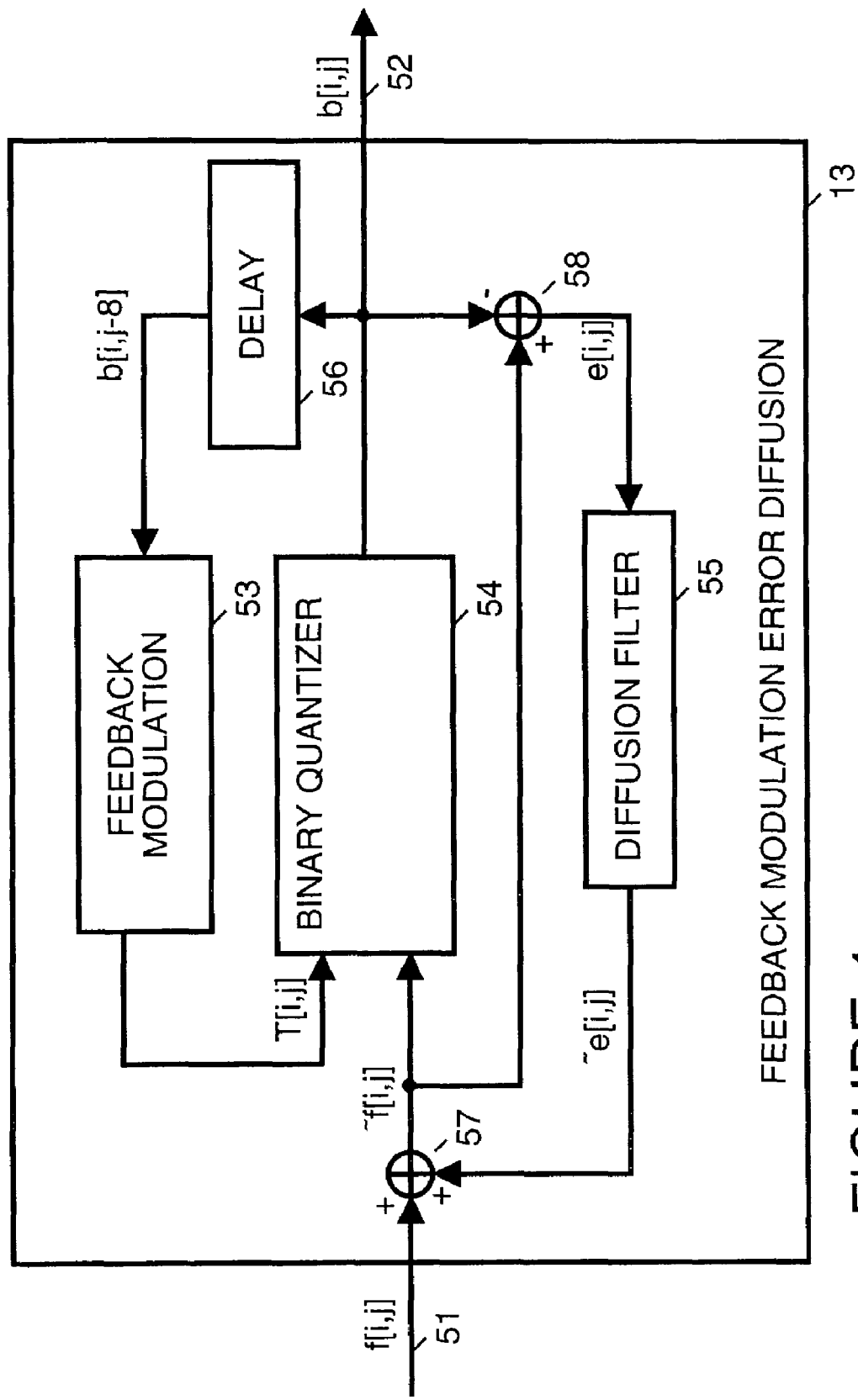
FIG. 4 is a simplified block diagram of a feedback modulation error diffusion block in accordance with a preferred embodiment of the present invention.

FIG. 4 is a simplified block diagram of feedback modulation error diffusion block 13. Feedback modulation error diffusion block 13 is shown to include a feedback modulation block 53, a binary quantizer block 54, a delay 56, a diffusion filter 55, an adder 57 and an adder 58.

Feedback modulation error diffusion block 13 receives a normalized pixel value f[i,j] of input image 11 on an input 51. The normalized pixel value f[i,j] of input image 11 is normalized to have a value between 0 and 1.

Adder 57 adds to normalized pixel value f[i,j] an accumulated diffusion error e[i,j] to produce a diffused pixel value f[i,j]. Binary quantizer block 54 compares diffused pixel value f[i,j] to a threshold T[i,j] to produce a binary pixel value b[i,j]. For example, Equation 1 below gives an example of potential operation of binary quantizer block 54 in generating binary pixel value b[i,j].

For $f[i,j] \geq T[i,j]$: $b[i,j]=1$     Equation 1

For $f[i,j] < T[i,j]$: $b[i,j]=0$

Binary pixel value b[i,j] is placed on an output 52 of feedback modulation error diffusion block 13. Binary pixel value b[i,j] is also used to generate a threshold and an error diffusion for subsequent pixels.

A delay 56 receives binary pixel value b[i,j] and performs a delay so that the binary pixel value b[i,j] is used in the calculation of a threshold for a subsequent pixel. For example, the delay is equivalent to eight horizontal pixels. Thus, the binary pixel value b[i,j−8] is used by feedback modulation block 53 when calculating threshold T[i,j] for binary pixel value b[i,j]. For example, feedback modulation block 53 calculates T[i,j] for binary pixel value b[i,j] as set out in Equation 2 below.

$$T[i,j]=0.5-a(b[i,j-8]-0.5)$$     Equation 2

The 8 pixel delay corresponds to the 8 bits in a single byte, so this adaptive feedback modulation results in byte sequences that tend to repeat. The parameter a is generally less than 1 and greater than 0 and is chosen to allow the desired performance for a given system. In particular, if b[i,j−8]=1, then the threshold is less than 0.5. If b[i,j−8]=0, then the threshold is greater than 0.5. Intuitively, a smaller threshold encourages a "1" value at the output of binary quantizer block 54, while a larger threshold encourages a "0" value at the output of binary quantizer block 54. So b[i,j] tends to repeat the value of b[i,j−8].

Diffusion filter 55 uses, for example, an error diffusion scheme to produce accumulated diffusion error e[i,j]. For example, adder 58 subtracts the binary pixel value b[i,j] from the diffused pixel value f[i,j] to produce a pixel error value e[i,j]. Diffusion filter 55 diffuses this error by accumulating portions of the error to subsequent pixels using an error diffusion algorithm such as Floyd Steinberg error diffusion or tone dependent error diffusion. For each pixel [i,j], diffusion filter 55 produces accumulated diffusion error e[i,j].

Figure 5:
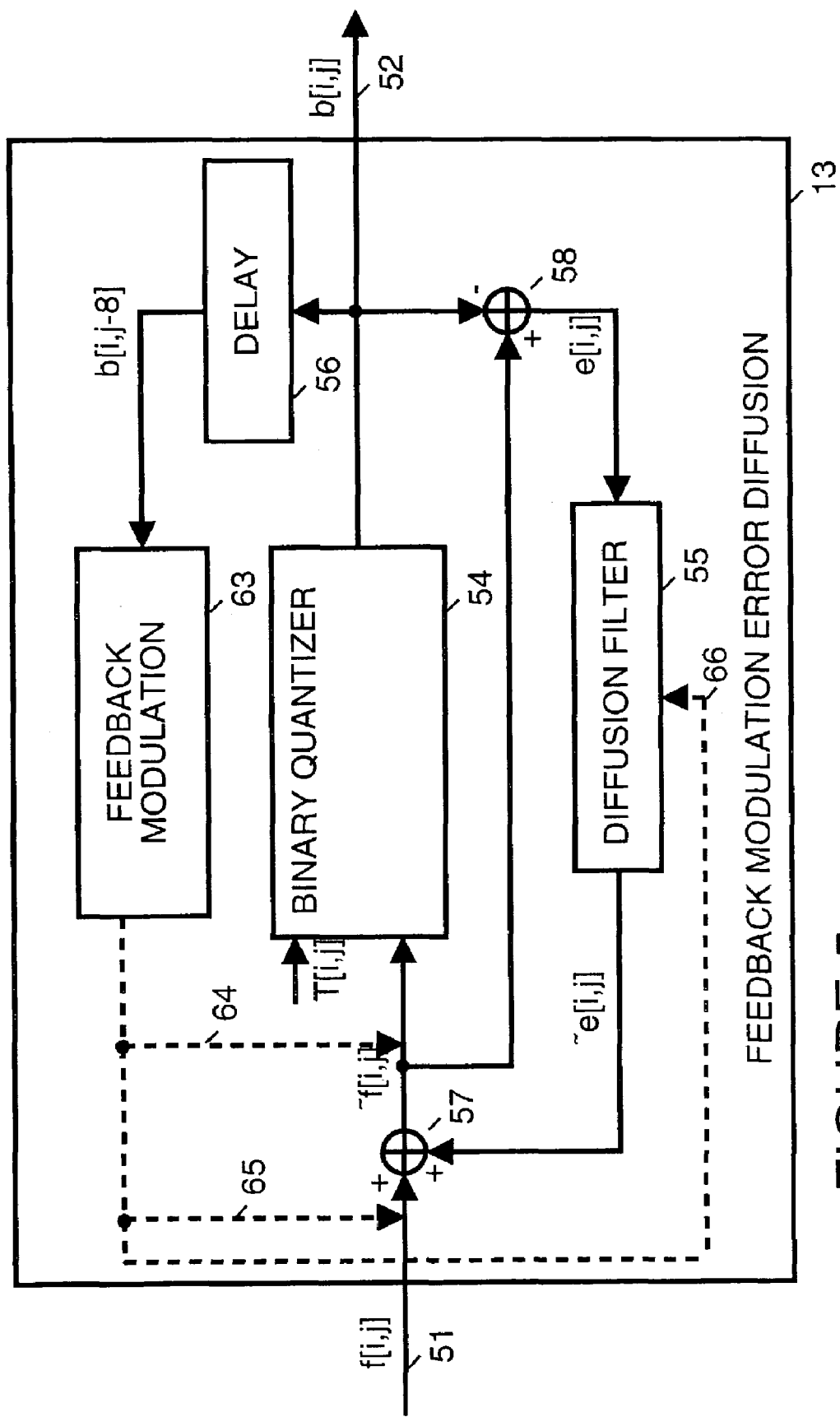
FIG. 5 is a simplified block diagram of a feedback modulation error diffusion block in accordance with an alternative preferred embodiment of the present invention.

While FIG. 4 shows feedback modulation 53 incorporating feedback when generating a threshold value, a fixed threshold can be used and a feedback value from feedback modulation 63 can be used to generate and/or modify diffused pixel value f[i,j], as illustrated by FIG. 5. The feedback value from feedback modulation 63 can be used in a number of places during the generation of diffused pixel value f[i,j].

For example, as illustrated by an arrow 64, shown in FIG. 5, the feedback value can be used to modify diffused pixel value f[i,j] just before diffused pixel value t[i,j] enters binary quantizer 54. As illustrated by an arrow 65, the feedback value can be used to modify normalized pixel value f[i,j] just before (or when) accumulated diffusion error e[i,j] is added to normalized pixel value f[i,j] to produce diffused pixel value t[i,j]. As illustrated by an arrow 66, the feedback value can be used by diffusion filter 55 in the generation of accumulated diffusion error e[i,j] used to produce diffused pixel value [i,j].

While FIG. 4 and FIG. 5 are shown using a binary quantizer, the present invention works equally well with a multilevel quantizer system and a vector (e.g. color) quantizing system.

Figure 6:
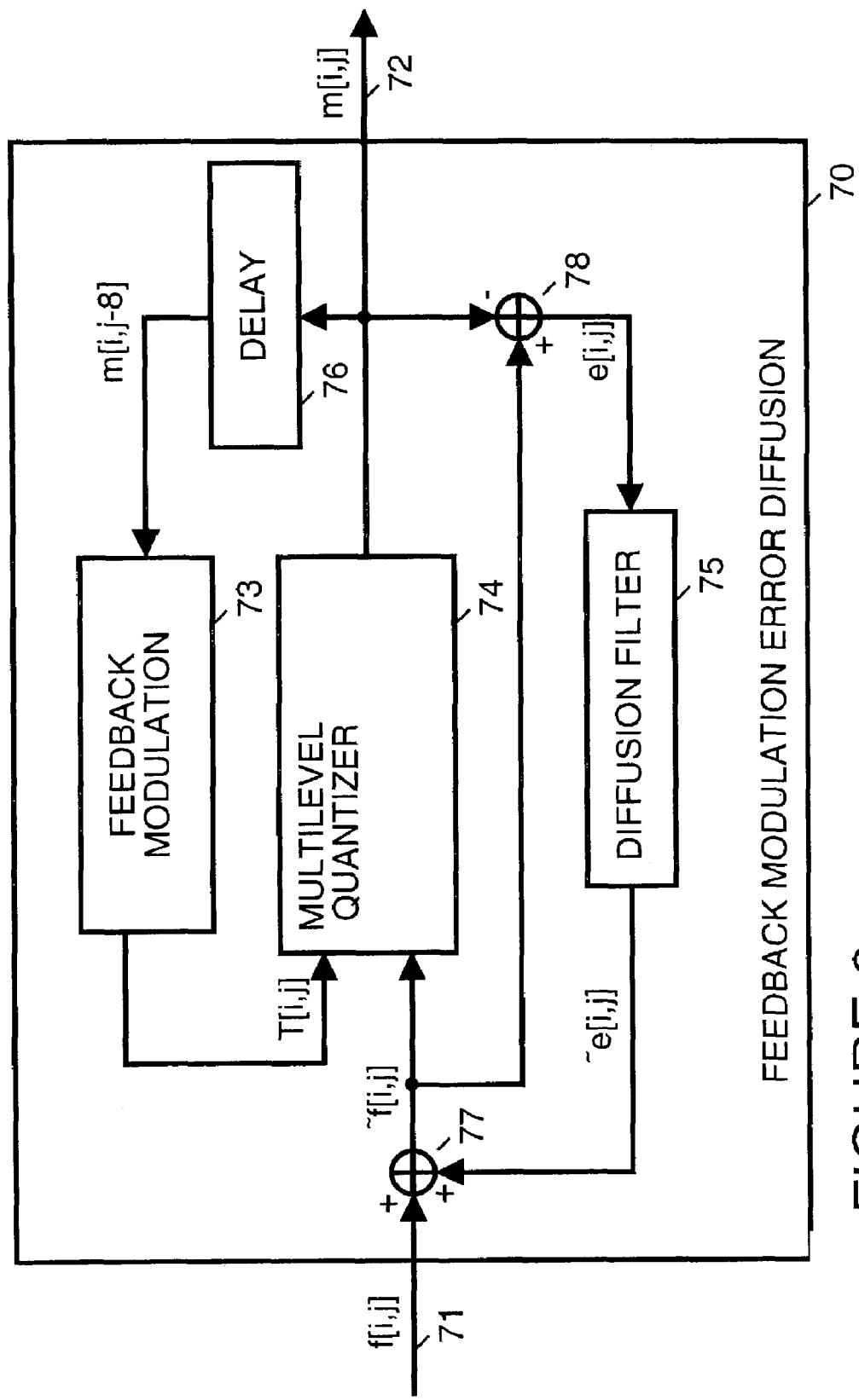
FIG. 6 is a simplified block diagram of a feedback modulation error diffusion block in accordance with another alternative preferred embodiment of the present invention.

For example, FIG. 6 is a simplified block diagram of a feedback modulation error diffusion block 70. Feedback modulation error diffusion block 70 is shown to include a feedback modulation block 73, a multilevel quantizer block 74, a delay 76, a diffusion filter 75, an adder 77 and an adder 78.

Feedback modulation error diffusion block 70 receives a normalized pixel value f[i,j] of input image 11 on an input 71. The normalized pixel value f[i,j] of input image 11 is normalized, for example, to have a value between 0 and 2.

Adder 77 adds to normalized pixel value f[i,j] an accumulated diffusion error e[i,j] to produce a diffused pixel value [i,j]. Multilevel quantizer block 74 compares diffused pixel value f[i,j] to a threshold value (T1[i,j], T2[i,j]), to produce a multilevel pixel value m[i,j]. For example, Equation 3 below gives an example of potential operation of multilevel quantizer block 74 in generating multilevel pixel value m[i,j].

For f[i,j]≧T2[i,j]: m[i,j]=2

For T1[i,j]≦f[i,j]<T2[i,j]: m[i,j]=1

For f[i,j]<T1[i,j]: m[i,j]=0    Equation 3

Multilevel pixel value m[i,j] is placed on an output 72 of feedback modulation error diffusion block 13. Multilevel pixel value m[i,j] is also used to generate a threshold value and an error diffusion for subsequent pixels.

A delay 76 receives multilevel pixel value m[i,j] and performs a delay so that the multilevel pixel value m[i,j] is used in the calculation of a threshold value for a subsequent pixel. For example, the delay is equivalent to eight horizontal pixels. Thus, the multilevel pixel value m[i,j−8] is used by feedback modulation block 73 when calculating threshold value (T1[i,j], T2[i,j]) for multilevel pixel value m[i,j].

Diffusion filter 75 uses, for example, an error diffusion scheme to produce accumulated diffusion error e[i,j]. For example, adder 78 subtracts the multilevel pixel value m[i,j] from the diffused pixel value f[i,j] to produce a pixel error value e[i,j]. Diffusion filter 75 diffuses this error by accumulating portions of the error to subsequent pixels using an error diffusion algorithm such as Floyd Steinberg error diffusion or tone dependent error diffusion. For each pixel [i,j], diffusion filter 75 produces accumulated diffusion error e[i,j].

Figure 7:
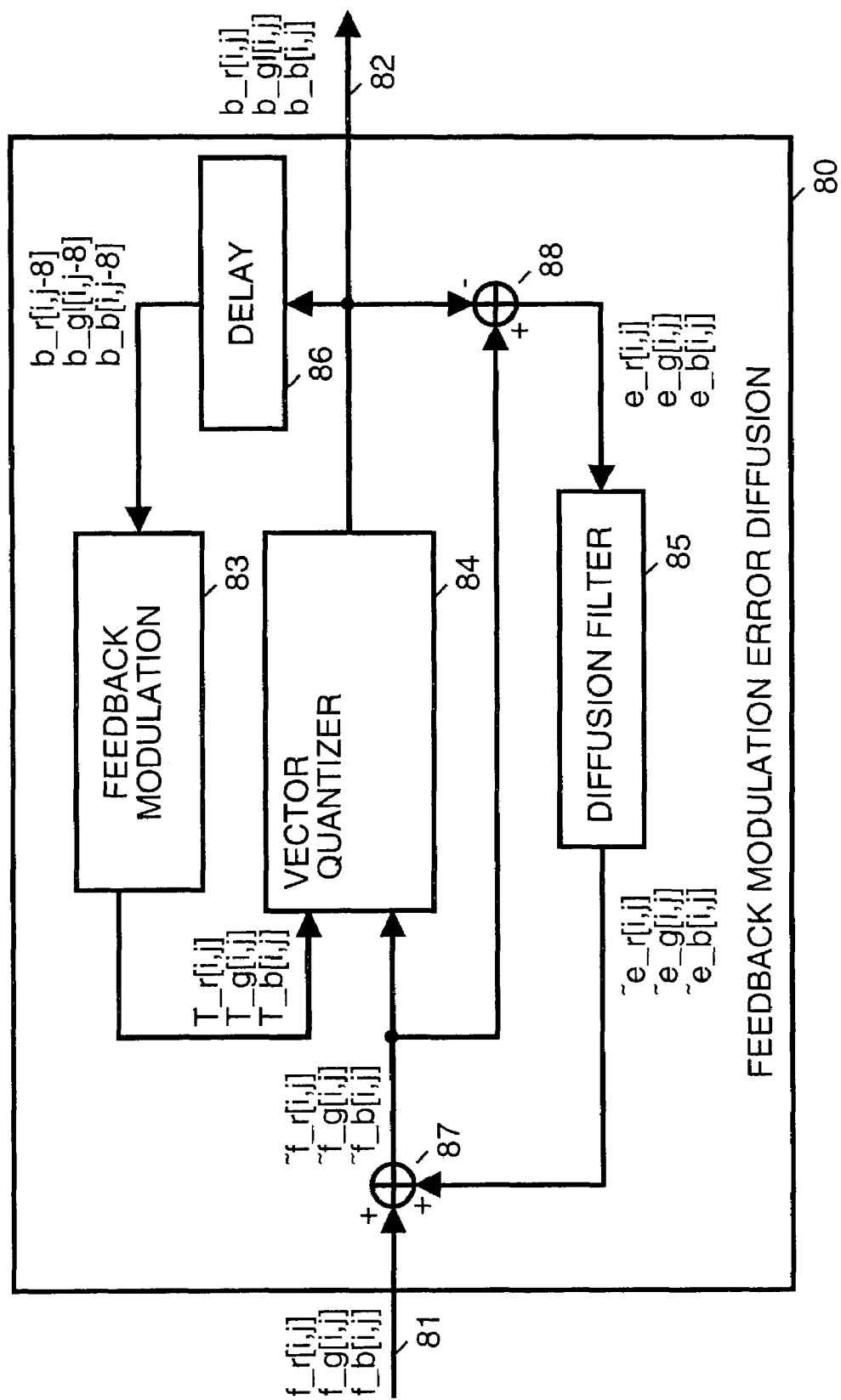
FIG. 7 is a simplified block diagram of a feedback modulation error diffusion block in accordance with another alternative preferred embodiment of the present invention.

FIG. 7 is a simplified block diagram of an embodiment of the present invention where vector quantization is performed. A feedback modulation error diffusion block 80 is shown to include a feedback modulation block 83, a vector quantizer block 84, a delay 86, a diffusion filter 85, an adder 87 and an adder 88.

Feedback modulation error diffusion block 80 receives a normalized pixel value (f_r[i,j], f_g[i,j], f_b[i,j]) of input image 11 on an input 81. The normalized pixel value (f_r[i,j], f_g[i,j], f_b[i,j]) of input image 11 is normalized to have a value between (0,0,0) and (1,1,1).

Adder 87 adds to normalized pixel value (f_r[i,j], f_g[i,j], f_b[i,j]) an accumulated diffusion error (e_r[i,j], e_g[i,j], e_b[i,j]) to produce a diffused pixel value (f_r[i,j], f_g[i,j], f_b[i,j]). Vector quantizer block 84 compares diffused pixel value (f_r[i,j], f_g[i,j], f_b[i,j]) to a threshold value (T_r[i,j], T_g[i,j], T_b[i,j]), to produce a vector pixel value (b_r[i,j], b_g[i,j], b_b[i,j]).

Vector pixel value (b_r[i,j], b_g[i,j], b_b[i,j]) is placed on an output 82 of feedback modulation error diffusion block 80. Vector pixel value (b_r[i,j], b_g[i,j], b_b[i,j]) is also used to generate a threshold value and an error diffusion for subsequent pixels.

A delay 86 receives, vector pixel value (b_r[i,j], b_g[i,j], b_b[i,j]) and performs a delay so that the vector pixel value (b_r[i,j], b_g[i,j], b_b[i,j]) is used in the calculation of a threshold value for a subsequent pixel. For example, the delay is equivalent to eight horizontal pixels. Thus, the vector pixel value (b_r[i,j−8], b_g[i,j−8], b_b[i,j−8]) is used by feedback modulation block 83 when calculating threshold value (T_r[i,j], T_g[i,j], T_b[i,j]) for vector pixel value (b_r[i,j], b_g[i,j], b_b[i,j]).

Diffusion filter 85 uses, for example, an error diffusion scheme to produce accumulated diffusion error (e_r[i,j], e_g[i,j], e_b[i,j]). For example, adder 88 subtracts the vector pixel value (b_r[i,j], b_g[i,j], b_b[i,j]) from the diffused pixel value (f_r[i,j]; f_g[i,j], f_b[i,j]) to produce a pixel error value (e_r[i,j], e_g[i,j], e_b[i,j]). Diffusion filter 85 diffuses this error by accumulating portions of the error to subsequent pixels using an error diffusion algorithm such as Floyd Steinberg error diffusion or tone dependent error diffusion. For each pixel [i,j], diffusion filter 85 produces accumulated diffusion error (e_r[i,j], e_g[i,j], e_b[i,j]).

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A device to translate an input pixel value to an output pixel value for a current pixel, comprising:
   a diffusion block to produce a diffusion error to add to the input pixel value to produce a diffused pixel value;
   a feedback modulation block to generate a threshold value, the threshold value determined using a value of only one earlier output pixel value, the earlier output pixel value occurring at a predetermined number of pixels prior to the current pixel; and,
   a quantizer to compare the diffused pixel value to the threshold value and based on the comparison to select a value for the output pixel value.

2. A device as in claim 1 wherein the predetermined number of pixels is eight.

3. A device as in claim 1 wherein the feedback modulation block includes a configuration to generate the threshold value in accordance with the equation below:

$$T[i,j]=0.5-a(b[i,j-]-0.5)$$

where T[i,j] is the threshold value, b[i,j-8] is the earlier output pixel value and a is a selected value between 0 and 1.

4. A device as in claim 1 wherein the quantizer includes a configuration to select the value for the output pixel value based on the equation below:

$$\text{For } f[i,j] \geq T[i,j]: b[i,j]=1$$

$$\text{For } f[i,j] < T[i,j]: b[i,j]=0$$

where T[i,j] is the threshold value, b[i,j] is the output pixel value and f[i,j] is the diffused pixel value.

5. A device as in claim 1 wherein the device is an imaging device to perform digital sending.

6. A device to translate an input pixel value to an output pixel value for a current pixel, comprising:
- a diffusion block to produce a diffusion error to add to the input pixel value to produce a diffused pixel value;
- a feedback modulation block to generate a threshold value, the threshold value determined using a value of only one earlier output pixel value, the earlier output pixel value occurring at a predetermined number of pixels prior to the current pixel; and,
- a quantizer to compare the diffused pixel value to the threshold value and based on the comparison to select a value for the output pixel value;
- wherein the device additionally comprises scanning hardware and a compression module.

7. A device as in claim 1 wherein the quantizer is a binary quantizer.

8. A device to translate an input pixel value to an output pixel value for a current pixel, comprising:
- a diffusion block to produce a diffusion error to add to the input pixel value to produce a diffused pixel value;
- a feedback modulation block to generate a threshold value, the threshold value determined using a value of only one earlier output pixel value, the earlier output pixel value occurring at a predetermined number of pixels prior to the current pixel; and,
- a quantizer to compare the diffused pixel value to the threshold value and based on the comparison to select a value for the output pixel value;
- wherein the quantizer is a multilevel quantizer.

9. A device to translate an input pixel value to an output pixel value for a current pixel, comprising:
- a diffusion block to produce a diffusion error to add to the input pixel value to produce a diffused pixel value;
- a feedback modulation block to generate a threshold value, the threshold value determined using a value of only one earlier output pixel value, the earlier output pixel value occurring at a predetermined number of pixels prior to the current pixel; and,
- a quantizer to compare the diffused pixel value to the threshold value and based on the comparison to select a value for the output pixel value;
- wherein the quantizer is a vector quantizer and the output pixel value is a multiple vector pixel value.

10. A device that translates an input pixel value of an image to an output pixel value for a current pixel, the device comprising:
- a first error diffusion block that generates a first potential output pixel value;
- a second error diffusion block, the second error diffusion block comprising:
  - a feedback modulation block that generates a threshold value, the threshold value taking into account a value of an earlier output pixel value, the earlier output pixel value occurring at a predetermined number of pixels prior to the current pixel, and
  - a quantizer, the quantizer using the threshold value when performing a comparison to select a second potential output pixel value; and,
- a gate to select one of the first potential output pixel value and the second potential output pixel value to be the output pixel value.

11. A device as in claim 10 additionally comprising a segmentation block to control the gate, the segmentation block for causing the gate to select the second potential output pixel value to be the output pixel value for pixels of the image the segmentation block recognizes as background region.

12. A device as in claim 10 where the first error diffusion block performs Floyd Steinberg error diffusion.

13. A device as in claim 10 wherein the second error diffusion block additionally comprises:
- a diffusion block to produce a diffusion error to add to the input pixel value to produce a diffused pixel value, the quantizer to compare the diffused pixel value to the threshold value and based on the comparison to select the value for the second potential output pixel value.

14. A device as in claim 10 wherein the predetermined number of pixels is eight.

15. A device as in claim 10 wherein the feedback modulation block includes a configuration to generate the threshold value in accordance with the equation below:

$$T[i,j]=0.5-a(b[i,j-8]-0.5)$$

where T[i,j] is the threshold value, b[i,j-8] is the earlier output pixel value and a is a selected value between 0 and 1.

16. A device as in claim 10:
- wherein the second error diffusion block additionally comprises a diffusion block to produce a diffusion error that is added to the input pixel value to produce a diffused pixel value; and,
- wherein the quantizer includes a configuration to compare the diffused pixel value to the threshold value and based on the comparison to select the value for the second potential output pixel value based on the equation below:

$$\text{For } f[i,j] \geq T[i,j]: b[i,j]=1$$

$$\text{For } f[i,j] < T[i,j]: b[i,j]=0$$

where T[i,j] is the threshold value, b[i,j] is the output pixel value and f[i,j] is the diffused pixel value.

17. A device as in claim 10 wherein the device is an imaging device configured to perform digital sending.

18. A device as in claim 10 wherein the device is included within an imaging device to perform digital sending.

19. A device as in claim 10 wherein the device additionally comprises scanning hardware and a compression module.

20. A method that translates an input pixel value of an image to an output pixel value for a current pixel, the method comprising:
- (a) producing a diffusion error;
- (b) adding the diffusion error to the input pixel value to produce a diffused pixel value;
- (c) generating a threshold value, the threshold value taking into account a value of only one earlier output pixel value, the earlier output pixel value occurring at a predetermined number of pixels prior to the current pixel; and, (d) comparing the diffused pixel value to the threshold value and based on the comparison selecting a value for the output pixel value.

21. A method as in claim 20 wherein step (c) includes generating the threshold value in accordance with the equation below:

$$T[i,j]=0.5-a(b[i,j-8]-0.5)$$

where T[i,j] is the threshold value, b[i,j−8] is the earlier output pixel value and a is a selected value between 0 and 1.

22. A method as in claim 20 wherein step (d) includes selecting the value for the output pixel value based on the equation below:

For f[i,j]≧T[i,j]: b[i,j]=1

For f[i,j]<T[i,j]: b[i,j]=0 where T[i,j] is the threshold value, b[i,j] is the output pixel value and f[i,j] is the diffused pixel value.

23. A method that translates an input pixel value of an image to an output pixel value for a current pixel, the method comprising:
   (a) producing a diffusion error;
   (b) adding the diffusion error to the input pixel value to produce a diffused pixel value;
   (c) generating a threshold value, the threshold value taking into account a value of only one earlier output pixel value, the earlier output pixel value occurring at a predetermined number of pixels prior to the current pixel; and,
   (d) comparing the diffused pixel value to the threshold value and based on the comparison selecting a value for the output pixel value;
   wherein the predetermined number of pixels is eight.

24. A method that translates an input pixel value of an image to an output pixel value for a current pixel, the method comprising:
   (a) using an error diffusion algorithm to generate a first potential output pixel value;
   (b) generating a second potential output pixel value, including the following substeps:
      (b.1) generating a threshold value, the threshold value taking into account a value of an earlier output pixel value, the earlier output pixel value occurring at a predetermined number of pixels prior to the current pixel, and
      (b.2) using the threshold value when performing a comparison to select a second potential output pixel value; and,
   (c) selecting one of the first potential output pixel value and the second potential output pixel value to be the output pixel value.

25. A method as in claim 24 wherein step (c) includes selecting the second potential output pixel value to be the output pixel value for pixels of the image the segmentation block recognizes as background region.

26. A method as in claim 24 wherein in (c) the output pixel value is a multiple vector pixel value.

27. A method as in claim 24 wherein in substep (b.1) the predetermined number of pixels is eight.

28. A method as in claim 24 wherein substep (b.1) includes generating the threshold value in accordance with the equation below:

$$T[i,j]=0.5-a(b[i,j-8]-0.5)$$

where T[i,j] is the threshold value, b[i,j−8] is the earlier output pixel value and a is a selected value between 0 and 1.

29. A device that translates an input pixel value of an image to an output pixel value for a current pixel, the device comprising:
   diffusion means for producing a diffusion error that is added to the input pixel value to produce a diffused pixel value;
   feedback modulation means for generating a threshold value, the threshold value taking into account a value of only one earlier output pixel value, the earlier output pixel value occurring at a predetermined number of pixels prior to the current pixel; and,
   quantizer means for comparing the diffused pixel value to the threshold value and based on the comparison selecting a value for the output pixel value.

30. A device as in claim 29 wherein the feedback modulation means generates the threshold value in accordance with the equation below:

$$T[i,j]=0.5-a(b[i,j-8]0.5)$$

where T[i,j] is the threshold value, b[i,j−8] is the earlier output pixel value and a is a selected value between 0 and 1.

31. A device as in claim 29 wherein the quantizer means selects the value for the output pixel value based on the equation below:

For f[i,j]≧T[i,j]: b[i,j]=1

For f[i,j]<T[i,j]: b[i,j]=0 where T[i,j] is the threshold value, b[i,j] is the output pixel value and f[i,j] is the diffused pixel value.

32. A device that translates an input pixel value of an image to an output pixel value for a current pixel, the device comprising:
   first error diffusion means for generating a first potential output pixel value;
   second error diffusion means for generating a second potential output pixel value, second error diffusion means comprising:
      feedback modulation means for generating a threshold value, the threshold value taking into account a value of an earlier output pixel value, the earlier output pixel value occurring at a predetermined number of pixels prior to the current pixel, and
      quantizer means for using the threshold value when performing a comparison to select a second potential output pixel value; and,
   gate means for selecting one of the first potential output pixel value and the second potential output pixel value to be the output pixel value.

33. A device as in claim 32 additionally comprising a segmentation means for controlling the gate, the segmentation means causing the gate to select the second potential output pixel value to be the output pixel value for pixels of the image the segmentation means recognizes as background region.

34. A device as in claim 32 wherein the feedback modulation means generates the threshold value in accordance with the equation below:

$$T[i,j]=0.5-a(b[i,j-8]-0.5)$$

where T[i,j] is the threshold value, b[i,j−8] is the earlier output pixel value and a is a selected value between 0 and 1.

35. Computer readable media containing software which, when executed, performs a method that translates an input pixel value of an image to an output pixel value for a current pixel, the method comprising:
   (a) producing a diffusion error;
   (b) adding the diffusion error to the input pixel value to produce a diffused pixel value;
   (c) generating a threshold value, the threshold value taking into account a value of only one earlier output pixel value, the earlier output pixel value occurring at a predetermined number of pixels prior to the current pixel; and,
   (d) comparing the diffused pixel value to the threshold value and based on the comparison selecting a value for the output pixel value.

36. Computer readable media as in claim 35 wherein step (c) includes generating the threshold value in accordance with the equation below:

$$T[i,j]=0.5-a(b[i,j-8]-0.5)$$

where T[i,j] is the threshold value, b[i,j−8] is the earlier output pixel value and a is a selected value between 0 and 1.

37. Computer readable media as in claim 35 wherein step (d) includes selecting the value for the output pixel value based on the equation below:

$$\text{For } f[i,j] \geq T[i,j]: b[i,j]=1$$

$$\text{For } f[i,j] < T[i,j]: b[i,j]=0$$

where T[i,j] is the threshold value, b[i,j] is the output pixel value and f[i,j] is the diffused pixel value.

38. Computer readable media containing software which, when executed, performs a method that translates an input pixel value of an image to an output pixel value for a current pixel, the method comprising:
   (a) using an error diffusion algorithm to generate a first potential output pixel value;
   (b) generating a second potential output pixel value, including the following:
      (b.1) generating a threshold value, the threshold value taking into account a value of an earlier output pixel value, the earlier output pixel value occurring at a predetermined number of pixels prior to the current pixel, and
      (b.2) using the threshold value when performing a comparison to select a second potential output pixel value; and,
   (c) selecting one of the first potential output pixel value and the second potential output pixel value to be the output pixel value.

39. Computer readable media as in claim 38 wherein step (c) includes selecting the second potential output pixel value to be the output pixel value for pixels of the image the segmentation block recognizes as background region.

40. Computer readable media as in claim 38 wherein substep (b.1) includes generating the threshold value in accordance with the equation below:

$$T[i,j]=0.5-a(b[i,j-8]-0.5)$$

where T[i,j] is the threshold value, b[i,j−8] is the earlier output pixel value and a is a selected value between 0 and 1.

41. A device that translates an input pixel value of an input image to an output pixel value for a current pixel, the device comprising:
   a diffusion block that produced a diffusion error;
   a feedback modulation block that generates a feedback value, the feedback value taking into account a value of only one earlier output pixel value, the earlier output pixel value occurring at a predetermined number of pixels prior to the current pixel; and,
   a quantizer that compares a diffused pixel value to a threshold value and based on the comparison selects a value for the output pixel value;
   wherein the diffusion error, the input pixel value and the feedback value are used in generating the diffused pixel value used by the quantizer.

42. A method for translating an input pixel value of an input image to an output pixel value for a current pixel, the method comprising:
   producing a diffusion error for the output pixel value;
   generating a feedback value, the feedback value taking into account a value of only one earlier output pixel value, the earlier output pixel value occurring at a predetermined number of pixels prior to the current pixel;
   using the diffusion error, the input pixel value and the feedback value to generate a diffused pixel value; and,
   comparing the diffused pixel value to a threshold value and based on the comparison selecting a value for the output pixel value.

* * * * *

UNITED STATES PATENT AND TRADEMARK OFFICE
CERTIFICATE OF CORRECTION

PATENT NO. : 7,301,674 B2
APPLICATION NO. : 10/284955
DATED : November 27, 2007
INVENTOR(S) : Guotong Feng et al.

It is certified that error appears in the above-identified patent and that said Letters Patent is hereby corrected as shown below:

In column 4, line 17, delete "e[i,j]" and insert -- $\tilde{e}[i,j]$ --, therefor.

In column 4, line 18, delete "f[i,j]" and insert -- $\tilde{f}[i,j]$ --, therefor.

In column 4, line 19, delete "f[i,j]" and insert -- $\tilde{f}[i,j]$ --, therefor.

In column 4, line 23(equation 1), delete "f[i,j]" and insert -- $\tilde{f}[i,j]$ --, therefor.

In column 4, line 25(equation 1), delete "f[i,j]" and insert -- $\tilde{f}[i,j]$ --, therefor.

In column 4, line 54, delete "e[i,j]" and insert -- $\tilde{e}[i,j]$ --, therefor.

In column 4, line 56, delete "f[i,j]" and insert -- $\tilde{f}[i,j]$ --, therefor.

In column 4, line 62, delete "e[i,j]" and insert -- $\tilde{e}[i,j]$ --, therefor.

In column 4, line 67, delete "f[i,j]" and insert -- $\tilde{f}[i,j]$ --, therefor.

In column 5, line 3, delete "f[i,j]" and insert -- $\tilde{f}[i,j]$ --, therefor.

In column 5, line 6, delete "f[i,j]" and insert -- $\tilde{f}[i,j]$ --, therefor.

In column 5, line 6, delete "t[i,j]" and insert -- $\tilde{f}[i,j]$ --, therefor.

In column 5, line 9, delete "e[i,j]" and insert -- $\tilde{e}[i,j]$ --, therefor.

In column 5, line 11, delete "t[i,j]" and insert -- $\tilde{f}[i,j]$ --, therefor.

In column 5, line 13, delete "e[i,j]" and insert -- $\tilde{e}[i,j]$ --, therefor.

In column 5, line 14, delete "[i,j]" and insert -- $\tilde{f}[i,j]$ --, therefor.

In column 5, line 31, delete "e[i,j]" and insert -- $\tilde{e}[i,j]$ --, therefor.

In column 5, line 32, delete "[i,j]" and insert -- $\tilde{f}[i,j]$ --, therefor.

In column 5, line 33, delete "f[i,j]" and insert -- $\tilde{f}[i,j]$ --, therefor.

UNITED STATES PATENT AND TRADEMARK OFFICE
CERTIFICATE OF CORRECTION

PATENT NO. : 7,301,674 B2
APPLICATION NO. : 10/284955
DATED : November 27, 2007
INVENTOR(S) : Guotong Feng et al.

It is certified that error appears in the above-identified patent and that said Letters Patent is hereby corrected as shown below:

In column 5, line 38(equation 3), delete "f[i,j]" and insert -- $\tilde{f}[i,j]$ --, therefor.

In column 5, line 40(equation 3), delete "f[i,j]" and insert -- $\tilde{f}[i,j]$ --, therefor.

In column 5, line 42(equation 3), delete "f[i,j]" and insert -- $\tilde{f}[i,j]$ --, therefor.

In column 5, line 56, delete "e[i,j]" and insert -- $\tilde{e}[i,j]$ --, therefor.

In column 5, line 58, delete "f[i,j]" and insert -- $\tilde{f}[i,j]$ --, therefor.

In column 5, line 64, delete "e[i,j]" and insert -- $\tilde{e}[i,j]$ --, therefor.

In column 6, lines 10-11, delete "(e_r[i,j], e_g[i,j], e_b[i,j])" and insert -- ($\tilde{e}$_r[i,j], $\tilde{e}$_g[i,j], $\tilde{e}$_b[i,j]) --, therefor.

In column 6, lines 11-12, delete "(f_r[i,j], f_g[i,j], f_b[i,j])" and insert -- ($\tilde{f}$_r[i,j], $\tilde{f}$_g[i,j], $\tilde{f}$_b[i,j]) --, therefor.

In column 6, line 13, delete "(f_r[i,j], f_g[i,j], f_b[i,j])" and insert -- ($\tilde{f}$_r[i,j], $\tilde{f}$_g[i,j], $\tilde{f}$_b[i,j]) --, therefor.

In column 6, lines 31-32, delete "(e_r[i,j], e_g[i,j], e_b[i,j])" and insert -- ($\tilde{e}$_r[i,j], $\tilde{e}$_g[i,j], $\tilde{e}$_b[i,j]) --, therefor.

In column 6, line 34, delete "(f_r[i,j]; f_g[i,j], f_b[i,j])" and insert -- ($\tilde{f}$_r[i,j], $\tilde{f}$_g[i,j], $\tilde{f}$_b[i,j]) --, therefor.

In column 6, line 40, delete "(e_r[i,j], e_g[i,j], e_b[i,j])" and insert -- ($\tilde{e}$_r[i,j], $\tilde{e}$_g[i,j], $\tilde{e}$_b[i,j]) --, therefor.

In column 7, line 1, in Claim 3, delete "T[i,j]=0.5-a(b[i,j-]-0.5)" and insert -- T[i,j]=0.5-a(b(i,j-8]-0.5) --, therefor.

In column 7, line 9, in Claim 4, delete "f[i,j]$\leq$" and insert -- $\tilde{f}[i,j]\geq$ --, therefor.

UNITED STATES PATENT AND TRADEMARK OFFICE
CERTIFICATE OF CORRECTION

| | |
|---|---|
| PATENT NO. | : 7,301,674 B2 |
| APPLICATION NO. | : 10/284955 |
| DATED | : November 27, 2007 |
| INVENTOR(S) | : Guotong Feng et al. |

It is certified that error appears in the above-identified patent and that said Letters Patent is hereby corrected as shown below:

In column 7, line 11, in Claim 4, delete "f[i,j]" and insert -- $\tilde{f}[i,j]$ --, therefor.

In column 7, line 13, in Claim 4, delete "f[i,j]" and insert -- $\tilde{f}[i,j]$ --, therefor.

In column 8, line 47, in Claim 16, delete "f[i,j]" and insert -- $\tilde{f}[i,j]$ --, therefor.

In column 8, line 49, in Claim 16, delete "f[i,j]" and insert -- $\tilde{f}[i,j]$ --, therefor.

In column 8, line 51, in Claim 16, delete "f[i,j]" and insert -- $\tilde{f}[i,j]$ --, therefor.

In column 9, line 18, in Claim 22, delete "f[i,j]" and insert -- $\tilde{f}[i,j]$ --, therefor.

In column 9, line 20, in Claim 22, delete "f[i,j]" and insert -- $\tilde{f}[i,j]$ --, therefor.

In column 9, line 22, in Claim 22, delete "f[i,j]" and insert -- $\tilde{f}[i,j]$ --, therefor.

In column 10, line 23, in Claim 30, delete "T[i,j]=0.5-a(b[i,j-8]-0.5)" and insert -- T[i,j]=0.5-a(b[i,j-8]-0.5) --, therefor.

In column 10, line 32, in Claim 31, delete "f[i,j]" and insert -- $\tilde{f}[i,j]$ --, therefor.

In column 10, line 34, in Claim 31, delete "f[i,j]" and insert -- $\tilde{f}[i,j]$ --, therefor.

In column 10, line 36, in Claim 31, delete "f[i,j]" and insert -- $\tilde{f}[i,j]$ --, therefor.

In column 11, line 30, in Claim 37, delete "f[i,j]" and insert -- $\tilde{f}[i,j]$ --, therefor.

In column 11, line 32, in Claim 37, delete "f[i,j]" and insert -- $\tilde{f}[i,j]$ --, therefor.

In column 11, line 34, in Claim 37, delete "f[i,j]" and insert -- $\tilde{f}[i,j]$ --, therefor.

UNITED STATES PATENT AND TRADEMARK OFFICE
CERTIFICATE OF CORRECTION

| | | |
|---|---|---|
| PATENT NO. | : 7,301,674 B2 | |
| APPLICATION NO. | : 10/284955 | |
| DATED | : November 27, 2007 | |
| INVENTOR(S) | : Guotong Feng et al. | |

It is certified that error appears in the above-identified patent and that said Letters Patent is hereby corrected as shown below:

In column 12, line 21, in Claim 41, delete "produced" and insert -- produces --, therefor.

Signed and Sealed this

Seventh Day of October, 2008

JON W. DUDAS
*Director of the United States Patent and Trademark Office*